United States Patent [19]
Kerfoot et al.

[11] 3,988,418
[45] Oct. 26, 1976

[54] HYDROMETALLURGICAL PRODUCTION OF TECHNICAL GRADE MOLYBDIC OXIDE FROM MOLYBDENITE CONCENTRATES

[75] Inventors: Derek G. E. Kerfoot, Pierrefonds; Robert W. Stanley, Kirkland, both of Canada

[73] Assignee: Noranda Mines Limited, Toronto, Canada

[22] Filed: Aug. 18, 1975

[21] Appl. No.: 605,443

[30] Foreign Application Priority Data
Oct. 17, 1974 Canada .................................. 211640

[52] U.S. Cl. ................................. 423/57; 423/55; 423/606; 423/50; 423/53; 423/54; 423/49
[51] Int. Cl.² ........................................ C01G 39/00
[58] Field of Search .................... 423/53, 56, 50, 52, 423/55, 57, 606

[56] References Cited
UNITED STATES PATENTS
3,739,057   6/1973   Daugherty et al. ................... 423/50
FOREIGN PATENTS OR APPLICATIONS
905,641   7/1972   Canada

OTHER PUBLICATIONS

Bjorling et al., "Journal of Chemistry, UAR", vol. 12, 1969, pp. 423–435.

Primary Examiner—Herbert T. Carter
Attorney, Agent, or Firm—Spencer & Kaye

[57] ABSTRACT

An improved hydrometallurgical method is provided for producing technical grade molybdic oxide from molybdenite concentrates. According to this method, the molybdenite concentrates are leached in an acid medium having a nitric acid concentration between about 25 gpl and about 50 gpl and an initial sulphuric acid concentration of nil to about 750 gpl, under oxygen pressure of about 100 – 250 psig and at a temperature above 115° C so as to produce technical grade molybdic oxide having not more than 0.1% sulphur. Then a liquid-solid separation of the reaction mixture is effected and the obtained leach liquor is recycled back to the leaching stage optionally after partial neutralization with a basic reagent. The solid is washed and recovered as technical grade molybdic oxide.

21 Claims, 3 Drawing Figures

HYDROMETALLURGICAL PRODUCTION OF TECHNICAL GRADE MOLYBDIC OXIDE FROM MOLYBDENITE CONCENTRATES

This invention relates to a novel method of producing hydrometallurgically technical grade molybdic oxide from molybdenite concentrates.

Technical molybdic oxide is usually prepared commercially by roasting molybdenum disulphide concentrates in air at temperatures of 550°–600° C. These molybdenum disulphide concentrates commonly contain minor amounts of silica and iron, copper and lead sulphides which are oxidized and report as impurities in the molybdic oxide product, and traces of rhenium sulphide which are also oxidized and partially volatilized in the roasting process. The volatilized rhenium can be recovered from the flue gases by known scrubbing techniques. Due to more and more stringent pollution controls, however, these roasting techniques, which produce great amounts of polluting gases, have now become unsatisfactory.

It is also known that molybdic oxide can be prepared from the molybdic acid obtained by leaching molybdenum containing minerals with nitric acid in a sealed vessel under increased partial pressures of oxygen and at elevated temperatures, using less than the theoretical concentration of nitric acid. This has been disclosed, for example, by G. Bjorling and G. A. Kolta in Intern. Mineral Process. Congr., Tech. Papers, 7th, New York City, 1964 — 127-38 and J. Chem. U.A.R. 12, No. 3, 423–435 (1969).

In the leaching of molybdenum minerals with nitric acid, molybdenum disulphide is oxidized to molybdic acid and sulphuric acid, according to the following equation:

$$MoS_2 + 6HNO_3 \rightarrow H_2MoO_4 + 2H_2SO_4 + 6NO$$

However, since molybdic acid is only soluble in the acid medium to a limited extent, precipitation of a large part of the molybdic acid occurs during the course of the oxidation process, and this precipitate can be filtered off from the solution, together with siliceous gangue, and can be used directly as technical grade molybdic acid or, following a simple calcining treatment, as technical grade molybdic oxide. If the reaction is carried out under sufficient pressure and at temperatures in excess of 115° C, the molybdic acid is dehydrated in situ to molybdic oxide, so that technical molybdic oxide can be obtained directly.

The major disadvantage of such processes, which has rendered them uneconomic in the past, is discussed in Canadian Pat. No. 905,641 issued July 25, 1972 to Bengt O. P. Möllerstedt and Karl-Erik Bäckius. It lies in the difficulty of recovering the dissolved molybdic acid from the leach liquor which also contains rhenium, copper, iron and other impurities in addition to sulphuric acid, and unconsumed nitric acid. The molybdenum content of this solution can represent as much as 20 to 25% by weight of the molybdenum content of the feed material.

It is known that such solutions can be treated by solvent extraction and ion exchange techniques to separate the molybdenum and rhenium values from the acid leach liquor. One such method is described in U.S. Pat. No. 3,739,057 of June 12, 1973 issued to Ellsworth W. Daugherty, Albert E. Erhard and James L. Drobnick. In this patent there is described a process using in the leaching stage a very low nitric acid concentration of between 10 and 25 gpl while controlling the temperature of the gas phase reaction zone in the pressure vessel, and then recovering from the obtained solution the molybdenum and rhenium values with an amine or quaternary ammonium type extractant. This is followed by stripping the molybdenum and rhenium values from the solvent with ammonium hydroxide, separating the rhenium from the molybdenum in the stripping solution with a quaternary ammonium type extractant, and finally recovering the molybdenum and rhenium by conventional techniques. However, it will be appreciated that such a process is relatively difficult and costly since it involves the treatment by solvent extraction of the entire liquid component of the reaction mixture, which is certainly a complex and expensive operation. In addition, nitric acid has a deleterious effect on molybdenum extraction and consequently the nitric acid content in the liquor passing to the solvent extraction stage must be kept very low. This is probably the reason for which very low concentrations of nitric acid are used according to U.S. Pat. No. 3,739,057 in spite of the fact that they will obviously result in lower conversions to molybdic oxide. Furthermore, the by-product sulphuric acid from such processes is relatively impure and does not find a ready market.

It is therefore the principal object of this invention to provide a novel hydrometallurgical method for the transformation of molybdenite concentrates into technical grade molybdic oxide which would obviate or substantially diminish the disadvantages of the presently known hydrometallurgical processes.

It is a further object of this invention to provide a more economical method of hydrometallurgical treatment of molybdenite concentrates to produce directly technical grade molybdic oxide.

Other objects and advantages of the present invention will be made obvious from the following more detailed description:

Thus, it has been surprisingly found according to the present invention that the yield of technical grade molybdic oxide which can be recovered directly by filtration from the nitric acid leach process can be increased from about 75–85% to at least 95% by recycling and reusing the leach liquor (after filtering off the molybdic oxide product) to leach a further quantity of molybdenite concentrate. Since the leaching medium is already saturated with molybdic acid, the precipitation of molybdic oxide from the molybdenite feed, in the second and subsequent leach steps, becomes substantially quantitative.

The method of the present invention for producing hydrometallurgically technical grade molybdic oxide from molybdenite concentrates basically comprises:

a. leaching the molybdenite concentrate in an acid medium having a nitric acid concentration between about 25 gpl and about 50 gpl and an initial sulphuric acid concentration of nil to about 750 gpl, under oxygen pressure of about 100 to 250 psig. and at a temperature above 115° C so as to produce technical grade molybdic oxide having not more than 0.1% sulphur;

b. effecting a liquid-solid separation of the resultant reaction mixture to separate the leach liquor from the solids;

c. recycling the leach liquor from the liquid-solid separation step (b) to the leaching step (a);

d. washing the solids of the liquid-solid separation step (b) and recovering the technical grade molybdic oxide; and e. repeating leaching step (a) with recycled leach liquor from step (c) after adjustment of the nitric acid and sulphuric acid concentrations.

It was found that in such leach liquor recycling method, a nitric acid concentration below about 25 gpl (about 0.45 lbs. of nitric acid per lb. of quadravalent molybdenum in the molybdenite concentrate) would be insufficient to give satisfactory conversion to technical grade molybdic oxide and concentrations above 50 gpl (about 0.90 lb. of $HNO_3$ per lb. of quadravalent molybdenum in the molybdenite concentrate) would be unnecessary because they would involve useless recycling or loss of nitric acid in wash water and would render the reaction control more difficult. The initial concentration of sulphuric acid in the leach liquor could be nil or it could be adjusted to a level of up to about 750 gpl, preferably up to 400 gpl, and it should be maintained at such level (referring to pure sulphuric acid) during the entire operation in order to prevent excessive dissolution of the molybdic oxide product. In accordance with the present invention the sulphuric acid concentration can readily be maintained at the desired level. In view of the fact that during the liquid-solid separation step, which is carried out after the leaching operation, (e.g. by filtration), the moist solid phase will retain a portion of the liquor of about 10 to 15%, this portion of the liquor removed with the solids will obviously contain a good proportion of sulphuric acid which is thus eliminated from the recycled leach liquor and replaced by an equivalent amount of water, thereby continuously maintaining the sulphuric acid concentration in the system at the desired value. It will be apparent that it is unnecessary to remove more liquor than about 15% during the liquid-solid separation in order to maintain the sulphuric acid concentration at the desired level, but if, for some reason, this became desirable one could easily remove some additional liquor at this stage and replace it by water or the like.

Optionally, the sulphuric acid concentration can be reduced by partial neutralization of the liquor after liquid-solid separation and washing, but prior to recycling. Such partial neutralization can be carried out with a calcium reagent such as CaO, $Ca(OH)_2$ or $CaCO_3$ until the pH value of the liquor reaches the isoelectric point of molybdic acid (pH ≃ 0.9). Up to that point, the dissolved molybdenum is present in solution as cationic molybdenyl species which remain in solution while calcium sulphate precipitates as gypsum. consequently the loss of molybdenum to the gypsum precipitate during such partial neutralization is negligible. The preferred pH limit for this operation is about 0.7.

Moreover, since calcium perrhenate is soluble in aqueous acid solutions, there is little possibility of rhenium co-precipitating with the calcium sulphate, so that repeated recycling of the leach solution leads to progressive enrichment of the solution with rhenium. By this technique rhenium can be recovered economically from concentrates of low rhenium content, since progressive enrichment of the leach solutions in rhenium is thereby achieved. A fraction of such enriched solution (generally less than 10%) can thus be removed during each cycle, from which rhenium and molybdenum can be separated by established solvent extraction or liquid ion exchange techniques, and the rhenium can be separated from the molybdenum by sorption on activated charcoal or by an ion exchange process.

This procedure, with the partial neutralization step, gives even higher direct recovery yields than without partial neutralization, namely of the order of 98%.

Furthermore, it was found that the leaching operation in accordance with the novel method of this invention should be effected under oxygen pressure of about 100 to 250 psig and at a temperature above 115° C and preferably between 120° and 160° C for a period of time sufficient to effect the required conversion to produce molybdic oxide having not more than 0.1% sulphur. In this regard, it is well known that technical grade $MoO_3$ should contain a maximum of 0.1% sulphur. It was found that only conversions of the order of about 99.5% or more give such low sulphur contents in the final technical $MoO_3$ product which is directly produced by this method.

It should also be noted that the leaching operation in accordance with this invention is carried out in a pressurized vessel or autoclave and, since the reaction is exothermic, the slurry which is being leached is cooled in the autoclave to maintain the temperature of said slurry between about 120° and 160° C. It has actually been found that there is essentially no temperature differential between the slurry and the gases in the upper part of the autoclave, indicating that the exothermic regeneration of nitric acid occurs in the slurry itself in accordance with this invention. There is thus no need for additionally controlling the temperature of the gas phase within the autoclave by providing complex means in such gas phase as this is done, for instance, in U.S. Pat. No. 3,739,057. The method of the present invention can be carried out in a regular autoclave or pressure vessel without any special additions or transformations thereof. However, the vessel or autoclave should preferably be so designed as to achieve optimum rates of oxygen transfer into the slurry.

The required conversion to achieve a sulphur control of 0.1% or less has usually been obtained, under operating conditions of this invention, within about 120 to 240 minutes. In many instances this conversion was 99.9%, which is practically quantitative.

The preferred operational leaching conditions in accordance with this invention are as follows:

| | |
|---|---|
| initial nitric acid concentration | about 25–40 gpl; |
| initial sulphuric acid concentration | below about 400 gpl; |
| temperature | about 120–160° C; |
| oxygen pressure | about 150–200 psig; |
| leaching time | about 180–240 minutes. |

The consumption of nitric acid under such process conditions is of the order of 5g/100g of molybdenite treated, which is certainly very economical.

The other conditions of the leaching operation are generally conventional. Thus, the leaching slurry may contain a suitable proportion of solids, but is usually carried out at about 10% solids. The particle size of the concentrate treated should be suitable to provide satisfactory contact surface area for the leaching operation which is carried out under agitation. The preferred particle size is about 50–80% minus 325 mesh.

After separation of the liquor from the solid reaction product of the leaching step, the obtained wet solids are washed to yield directly the technical grade molybdic oxide, which contains less than 0.1% sulphur and can be marketed as such. This product, although entirely satisfactory, has however a greyish colour rather than the usual yellow colour of the roasted molybdic oxide. This greyish colour is believed to be due to a slight surface reduction of molybdic oxide during drying of the product. If desired, the greyish product can be transformed into the usual yellow technical grade $MoO_3$, by optionally calcining it at a temperature of up to about 600° C. Obviously, since the molybdic oxide product has a sulphur content of less than 0.1%, such calcining operation produces essentially no objectionable $SO_2$ polluting gases.

The wash waters will contain some recoverable metal values, particularly some molybdenum and rhenium. These recoverable metal values can be recovered from the wash waters by the usual solvent extraction or liquid ion exchange techniques and the rhenium can be separated from the molybdenum by sorption on activated charcoal or by an ion exchange process. It will be appreciated that due to the fact that only a small portion of the overall leaching solution will be so treated at a time (up to about 20%), the solvent extraction or ion exchange treatment will be much simplified and will require much smaller investment for the construction, reagent inventory and maintenance of the solvent extraction or ion exchange systems necessary for such treatments. Furthermore, it will be appreciated that repeated recycling of the leach solution will lead to progressive enrichment of the solution with rhenium and therefore rhenium concentrations will be higher than usual and thus it can be more readily and more economically recovered by conventional techniques. However, if the initial molybdenite concentrate is such that the amount of rhenium is very low and unimportant in the overall economy of the process, it need not be recovered separately from molybdenum.

It will also be appreciated that other metal values present in the molybdenum concentrate will dissolve to some extent in the leach liquor so that recycling will lead to a progressive increase in the concentration of such metals. However, the removal of a small fraction of the liquor with the solids, in each cycle of the operation, as already described above, either with or without partial neutralization, will enable to control the concentration of these impurities to a satisfactory degree.

After recovery of the recoverable metal values from the wash waters, the wash waters, which are acidic in nature, can be neutralized, usually with calcium oxide, calcium hydroxide or calcium carbonate, and discarded.

The invention will now further be described with reference to the appended drawings in which.

Figure 1:
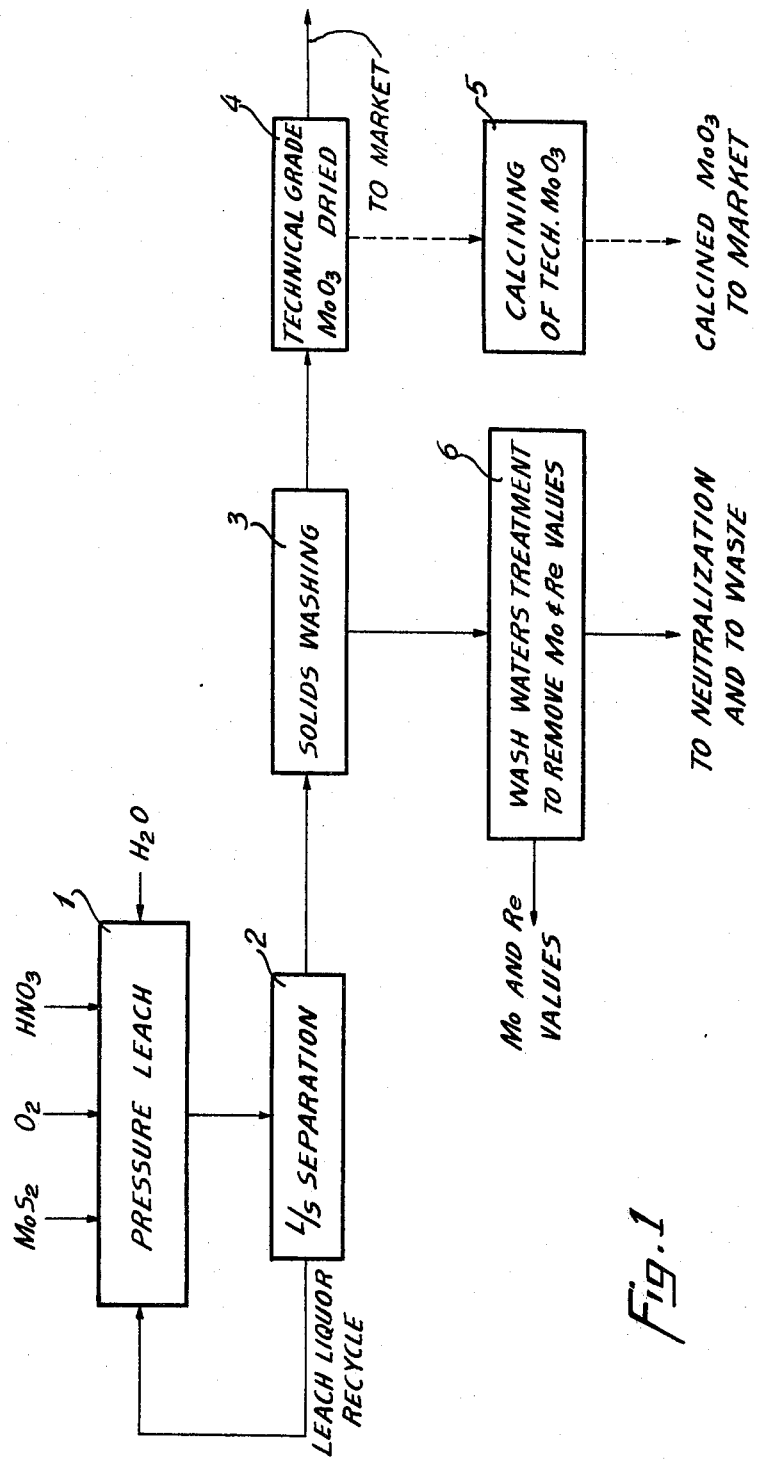
FIG. 1, represents a flow sheet of the basic preferred embodiment of the method according to the present invention.

As illustrated in FIG. 1, the pressure leach is carried out in a pressure vessel at 1 after introducing suitable quantities of $MoS_2$, $HNO_3$ and $H_2O$, in addition to the leach liquor which is recycled from the liquid-solid separation step 2. Obviously $O_2$ is also introduced to maintain a desired oxygen pressure.

Then, after the leaching has been completed at 1 and the liquid-solid separation effected at 2, e.g. by filtration, the solids obtained therefrom are washed at 3 leading to technical grade $MoO_3$ which is dried at 4 and which can then be directly marketed or optionally calcined at 5 to produce calcined $MoO_3$ for the market.

The wash waters from the washing step 3 are treated at 6 to remove recoverable metal values, such as those of molybdenum and rhenium, by conventional methods such as solvent extraction or ion exchange treatments. Again it should be stressed that since the so treated wash waters contain perhaps only about 10% of the leach liquor, the scale of this operation is much smaller and less costly than it would be in the absence of the recycle system which would necessitate the processing of all the molybdenum bearing leach liquor. Thus, the metal values from such treatment will be readily recovered and the acidic solution will then usually be neutralized by calcium oxide or calcium carbonate and sent to waste.

Figure 2:
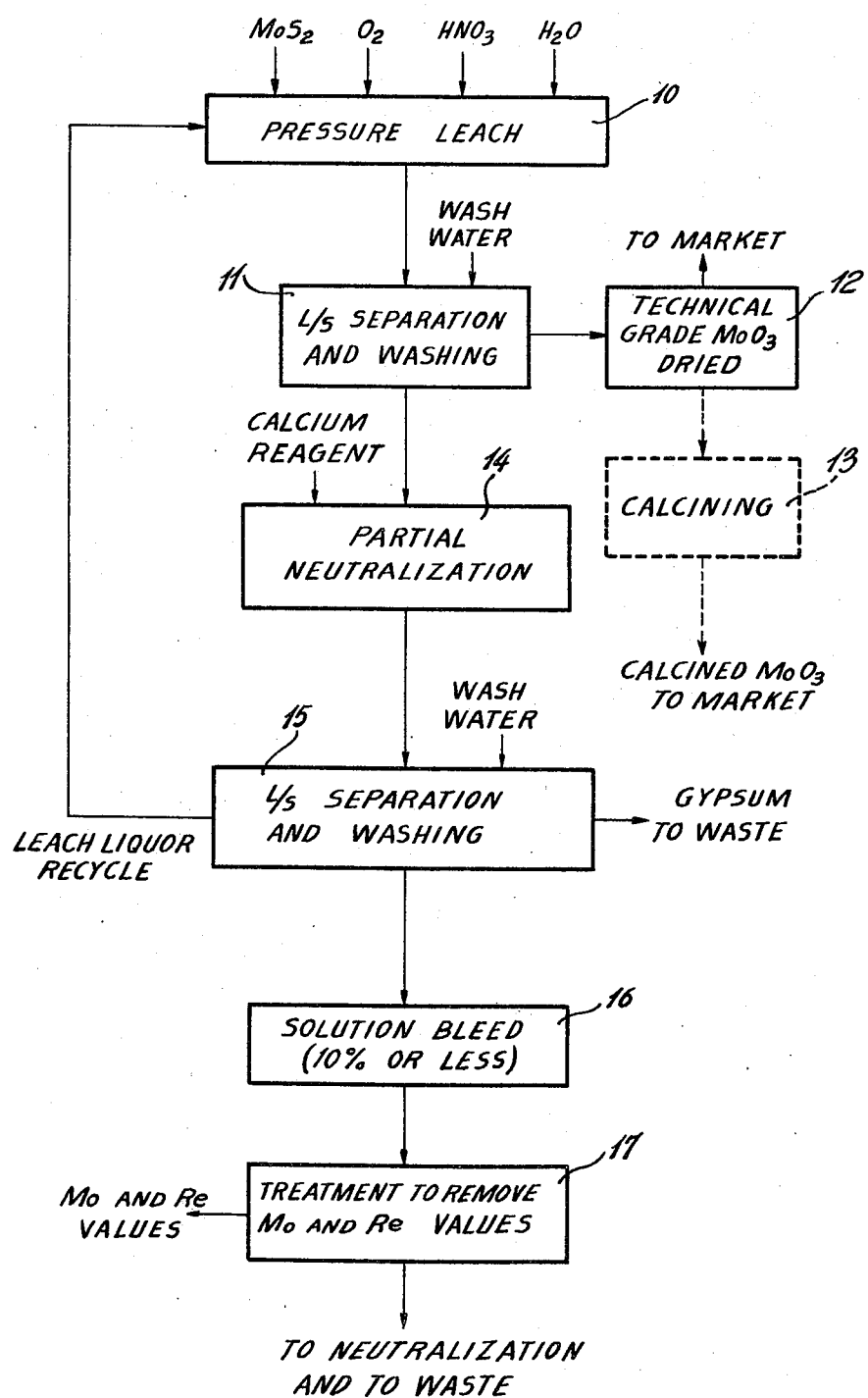
FIG. 2, represents a flow sheet of the optional embodiment comprising partial neutralization.

According to FIG. 2, the pressure leach is carried out in a pressure vessel at 10, again after introducing suitable quantities of $MoS_2$, $HNO_3$ and $H_2O$ as well as $O_2$ to maintain a desired oxygen pressure. Then, after the leaching has been completed at 10, a liquid-solid separation with washing is carried out at 11 and the solids obtained therefrom are dried at 12 and can constitute the technical grade $MoO_3$ suitable for the market. These solids can also be calcined, if desired, at 13 to produce calcined $MoO_3$ for the market.

The liquid phase from the solid-liquid separation 11 is then partially neutralized at 14 through addition of a calcium reagent until the pH reaches a maximum of about 0.9. Other basic reagents which would form an insoluble sulphate are also suitable. This is followed by another liquid-solid separation and washing at 15. The solid phase from this separation is essentially constituted of gypsum and is sent to waste. The liquid phase constitutes the leach liquor which is recycled back to the pressure vessel at 10.

A small portion of the liquid (about 10% or less) from liquid-solid separation at 15 is bled off and constitutes the solution bleed 16 which is treated at 17 in conventional manner, such as already discussed above with reference to wash waters treatment 6 in FIG. 1, to recover molybdenum and rhenium values therefrom. The solution from this treatment is then neutralized and sent to waste.

Figure 3:
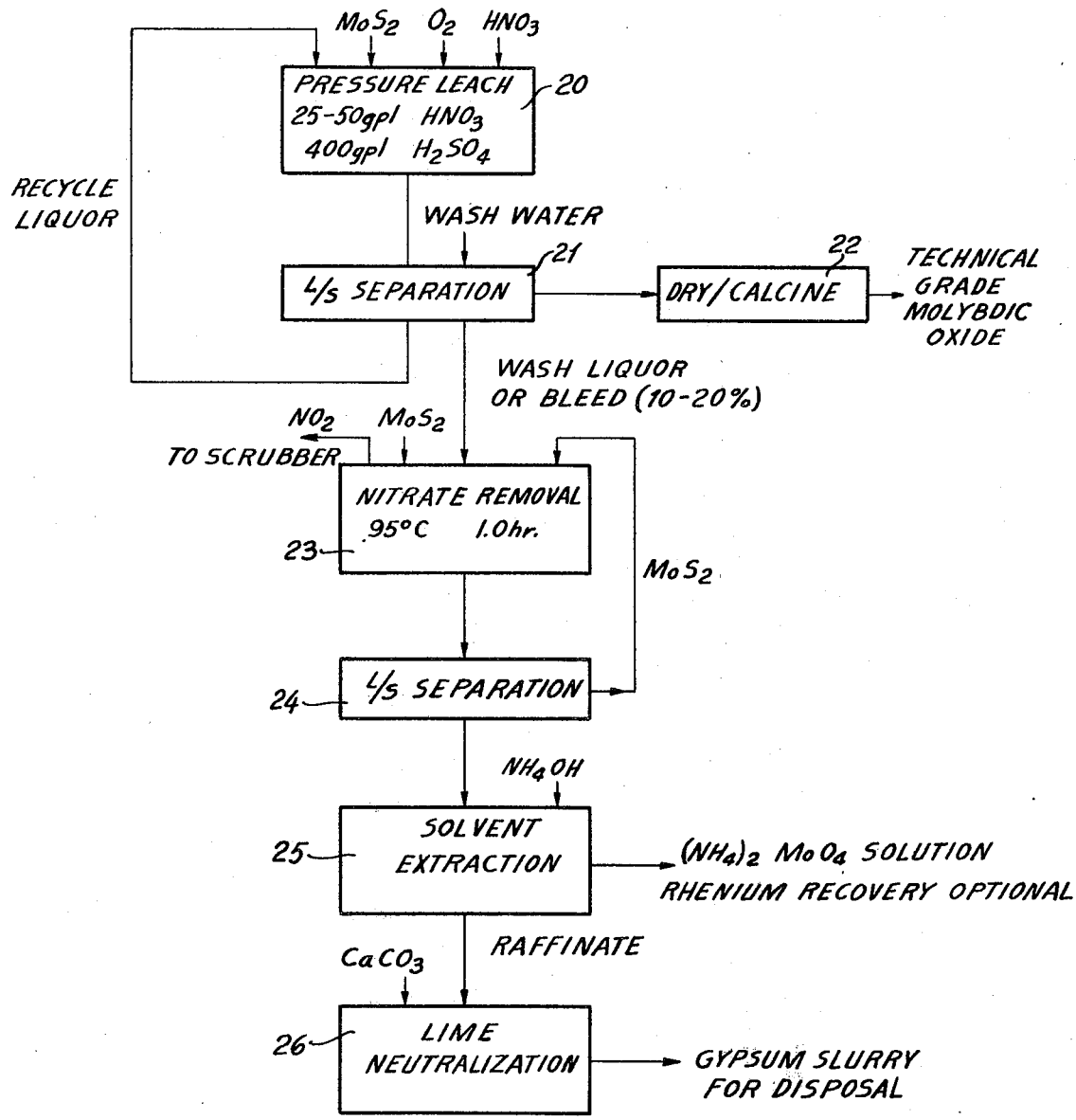
FIG. 3, represents a flow sheet of another embodiment in which the pressure leach is effected on a liquor with high initial concentration of sulphuric acid.

In the embodiment of FIG. 3, the pressure leach is carried out in a pressure vessel at 20 after introducing suitable quantities of $MoS_2$, $HNO_3$, $H_2SO_4$ and $H_2O$ as well as $O_2$ to maintin a desired oxygen pressure. A high initial $H_2SO_4$ content (400 gpl in this particular case) is utilized. Then after the leaching operation has been completed, liquid-solid separation is effected at 21 and the solids are dried or calcined at 22, as the case may be, to produce the desired technical grade molybdic oxide for the market. The liquor from this step 21 is recycled back to the pressure vessel 20 except for a small fraction or bleed of 10–20% which is treated at 23 for nitrate removal. In this regard, it should be noted that if the bleed contains too much nitric acid and if the recoverable metal values from this bleed are later recovered by solvent extraction using tertiary amine reagents, the nitric acid may be prejudicial to such solvent extraction recovery and it is removed in nitrate form by conventional treatment such as addition of $MoS_2$ and heating at 95° C for about 1 hr. The $NO_2$ gases produced during this treatment are sent to the scrubber.

After such nitrate removal at 23 another liquid-solid separation is carried out at 24 to separate excess unreacted $MoS_2$ which is recycled back to the nitrate removal step 23 or to the pressure leach step 20.

The liquid phase is then subjected to solvent extraction at 25 and stripped from the organic solvent, for example with $NH_4OH$, to produce $(NH_4)_2 MoO_4$ solution from which the Mo values are readily recovered. If desired, rhenium values can also be recovered in a conventional manner, as already discussed above. Finally the raffinate is subjected to lime neutralization at 26, for instance with $CaCO_3$, to form a gypsum slurry for disposal.

The invention will now further be described with reference to the following non-limitative examples:

EXAMPLE I

A sample of Gaspé molybdenite concentrate (100g) containing 56.1% molybdenum and 1.5% siliceous gangue was agitated in an aqueous solution containing between 15 and 50g of nitric acid in 1 litre of solution initially containing no sulphuric acid. This leaching operation was performed in an autoclave using an oxygen pressure of 200 psig, 10% solids density and a leaching time of 4 hours. The temperature ranged from 120° – 160° C. The precipitated molybdic oxide was filtered off and washed with water, leaving a residual solution containing molybdic acid, sulphuric acid, and nitric acid. The effect of initial nitric acid concentration on the conversion of the molybdenum disulphide to molybdic oxide is shown in the following table reproducing four tests in accordance with this example:

TABLE I

EFFECT OF NITRIC ACID CONCENTRATION

| Test No. | Temperature °C | Nitric Acid gpl | % Conversion $MoS_2$ to $MoO_3$ |
|---|---|---|---|
| 1 | 145 | 15 | 98.6 |
| 2 | 145 | 20 | 99.1 |
| 3 | 145 | 25 | 99.9 |
| 4 | 120–160 | 50 | 99.9 |

These tests show that nitric acid concentrations below 25 gpl do not produce sufficient conversion of over 99.5% of $MoS_2$ to $MoO_3$, which is necessary to obtain a sulphur content of 0.1% or less in the final product.

EXAMPLE II

The effect of reaction time was also studied with the procedure as set forth in Example I and the following results shown in Table II, illustrate this effect.

TABLE II

EFFECT OF REACTION TIME

| Test No. | Temperature °C | Time min. | Nitric Acid gpl | % Conversion $MoS_2$ to $MoO_3$ |
|---|---|---|---|---|
| 5 | 150 | 60 | 25 | 95.4 |
| 6 | 150 | 120 | 25 | 93.0 |
| 7 | 150 | 180 | 25 | 99.5 |
| 8 | 150 | 240 | 25 | 99.9 |
| 9 | 150 | 360 | 25 | 99.6 |
| 10 | 120 | 60 | 50 | 87.0 |
| 11 | 120–160 | 120 | 50 | 98.0 |
| 12 | 120–160 | 180 | 50 | 99.8 |
| 13 | 120–160 | 240 | 50 | 99.9 |

It will be apparent from this table that only times over 180 min. produced satisfactory conversion rates of 99.5% or more, required to obtain a sulphur content of 0.1% or less in the final product. However, with high sulphuric acid systems it was found that satisfactory conversion could be achieved in 120 min.

EXAMPLE III

The leach liquor from Test No. 3 of Example I was recycled back to the autoclave after partial neutralization thereof to a pH of 0.7 with $Ca(OH)_2$ and a new sample of molybdenite concentrate (100g) was leached therein under same conditions, after adjusting the nitric acid content to 25 gpl. The conversion of molybdenum disulphide to molybdic oxide was 99.5% and a satisfactory final product was obtained.

EXAMPLE IV

The procedure of Example III was repeated a total of five complete cycles and in the fifth cycle the conversion of molybdenite to molybdic oxide was also found to be 99.5% and a satisfactory final product was obtained.

EXAMPLE V

The effect of sulphuric acid concentration on the leach solution was studied by repeating Test No. 3 of Example I with various initial sulphuric acid concentrations.

The results are shown in the following Table III.

TABLE III

EFFECT OF SULPHURIC ACID CONCENTRATION

| Test No. | Initial Sulphuric Acid gpl | % Conversion $MoS_2$ to $MoO_3$ | Solubility of $MoO_3$ in solution gpl Mo |
|---|---|---|---|
| 14 | Nil | 99.8 | 12 |
| 15 | 200 | 99.5 | 12 |
| 16 | 300 | 99.5 | 14 |
| 17 | 400 | 99.7 | 18 |
| 18 | 550 | 99.4 | 22 |
| 19 | 750 | 99.8 | 30 |
| 20 | 850 | 99.6 | Complete |

These results suggest that sulphuric acid has no significant effect on the degree of conversion of molybdenite to molybdic oxide. The solubility of molybdic oxide in solution apparently increases relatively slowly with increasing sulphuric acid concentration up to about 750 gpl and thereafter increases rapidly. Thus with 25 gpl $HNO_3$ and without any sulphuric acid the solubility of molybdic oxide in the leach solution is 12 gpl Mo whereas in a 25 gpl of $HNO_3$ - 750 gpl $H_2SO_4$ it is 30 gpl Mo. However at 850 gpl $H_2SO_4$ and 25 gpl $HNO_3$ the solubility is essentially complete. Thus the approximate limit of 750 gpl must be preserved as the maximum concentration for $H_2SO_4$.

EXAMPLE VI

A five stage cyclic pressure leaching test on Brenda molybdenite concentrate containing 54.5% Mo with an initial solution containing 400 gpl sulphuric acid and 40 gpl nitric acid was carried out using 10% solids, an oxygen pressure of 200 psig, a temperature of 145° C and a leaching time of 4 hrs per cycle. 10 to 20% of the solution was removed after each cycle with the wash waters. This gave an average conversion of molybdenite to molybdic oxide of 99.7% and the direct recovery of molybdenum as molybdic oxide averaged 93.4%. Thorough washing of the molybdic oxide produced a product having a sulphur content of less than 0.1%, indicating that the product meeting market specifications can be directly produced in such high sulphuric acid systems. This test also showed that the sulphuric acid can be added right at the beginning to the initial solution in high concentration and that it will be maintained therein generally in such concentration during following cycles of the operation even without partial neutralization. Thus, the bleed of 10 to 20% of the solutions in each cycle is sufficient to remove essentially all the sulphate generated in each cycle.

In view of the above results, it is believed, that the novel method of the present invention has clearly produced a significant advance in the art of hydrometallurgical treatment of molybdenum concentrates to technical grade molybdic oxide.

We claim:
1. Method of producing hydrometallurgically technical grade molybdic oxide from molybdenite concentrates, which comprises:
   a. leaching the molybdenite concentrate in an acid medium having a nitric acid concentration between about 25 gpl and about 50 gpl and an initial sulphuric acid concentration of nil to about 750 gpl, under oxygen pressure of about 100 to 250 psig and at a temperature above 115° C so as to produce technical grade molybdic oxide having not more than 0.1% sulphur;
   b. effecting a liquid-solid separation of the resultant reaction mixture to separate the leach liquor from the solids;
   c. recycling the leach liquor from the liquid-solid separation step back to the leaching step (a);
   d. washing the solids of the liquid-solid separation and recovering the technical grade molybdic oxide; and
   e. repeating steps (a), (b), (c) and (d) to treat further quantities of molybdenite concentrate, each time using in the leaching operation of step (a) the recycled leach liquor from step (c) with adjusted nitric acid and sulphuric acid concentrations.

2. Method as claimed in claim 1, wherein the leaching operation is effected with a nitric acid concentration of about 25 – 40 gpl.

3. Method as claimed in claim 1, wherein the leaching operation is effected under an oxygen pressure of about 150 – 200 psig.

4. Method as claimed in claim 1, wherein the leaching operation is effected in an acid medium having initially no sulphuric acid therein.

5. Method as claimed in claim 1, wherein the leaching operation is effected in an acid medium having an initial sulphuric acid concentration of up to about 400 gpl.

6. Method as claimed in claim 1, wherein the leaching operation is effected at a temperature of about 120° – 160° C.

7. Method as claimed in claim 1, wherein the leaching operation is effected for a time period of about 120 – 240 min.

8. Method as claimed in claim 1, wherein the liquid-solid separation is effected by filtration.

9. Method as claimed in claim 1, wherein the liquid-solid separation is effected so as to retain up to about 15% of the liquid medium with the separated solids.

10. Method as claimed in claim 1, wherein the leach liquor from the liquid-solid separation is partially neutralized with a basic reagent which forms an insoluble sulphate, up to a pH of about 0.9, then another liquid-solid separation is effected and the obtained liquor is recycled back to the leaching step.

11. Method as claimed in claim 10, wherein said basic reagent is a calcium reagent.

12. Method as claimed in claim 11, wherein said calcium reagent is selected from the group of CaO, Ca(OH)$_2$ and CaCO$_3$.

13. Method as claimed in claim 12, wherein the leach liquor is partially neutralized to a pH of 0.7.

14. Method as claimed in claim 10, wherein a small portion of the leach liquor obtained after partial neutralization is bled-off while the remaining is recycled to the leaching step.

15. Method as claimed in claim 1, wherein the obtained technical grade molybdic oxide is further calcined.

16. Method as claimed in claim 1, wherein the wash waters from washing step (d) contain recoverable molybdenum and rhenium values, and said values are recovered from the said wash waters.

17. Method as claimed in claim 1, wherein the wash waters are neutralized.

18. Method as claimed in claim 14, wherein the bled-off portion contains recoverable molybdenum and rhenium values, and said values are recovered from the bled-off portion of the leach liquor.

19. Method of producing hydrometallurgically technical grade molybdic oxide from molybdenite concentrates, which comprises:
   a. leaching the molybdenite concentrate in an acid medium having a nitric acid concentration between about 25 gpl and 40 gpl and an initial sulphuric acid concentration between 0 and 400 gpl, under oxygen pressure of about 150 – 200 psig and at a temperature of about 120° – 160° C for a time period of about 180 – 240 min. so as to achieve at least about 99.5% conversion of molybdenite to molybdic oxide;
   b. effecting a liquid-solid separation of the resultant reaction mixture to separate the leach liquor from the solids and withdrawing up to about 20% of the liquid medium in addition to the separated solids;
   c. recycling the remaining leach liquor back to the leaching stage (a);
   d. washing the solids of the liquid-solid separation and recovering the technical grade molybdic oxide containing less than about 0.1% sulphur; and
   e. repeating steps (a), (b), (c) and (d) to treat further quantities of molybdenite concentrate, each time using in step (a) the recycled leach liquor from step (c) with adjusted nitric acid and sulphuric acid concentrations.

20. Method of producing hydrometallurgically technical grade molybdic oxide from molybdenite concentrates, which comprises:
   a. leaching the molybdenite concentrate in an acid medium having a nitric acid concentration between about 25 gpl and 40 gpl and an initial sulphuric acid concentration between 0 and 400 gpl, under oxygen pressure of about 150 – 200 psig and at a temperature of about 120° – 160° C for a time period of 180 – 240 min. so as to achieve at least about 99.5% conversion of molybdenite to molybdic oxide;

b. effecting a liquid-solid separation of the resultant reaction mixture to separate the leach liquor from the solids and washing the solids to recover technical grade molybdic oxide containing less than about 0.1% sulphur;

c. partially neutralizing the leach liquor from the liquid-solid separation with a calcium reagent up to a pH of about 0.7;

d. separating gypsum from the partially neutralized mixture;

e. recycling the leach liquor after gypsum separation back to the leaching step (a) while bleeding-off a small portion thereof; and f. repeating steps (a), (b), (c), (d) and (e) to treat further quantities of molybdenite concentrate, each time using in step (a) the recycled leach liquor from step (e) with adjusted nitric acid and sulphuric acid concentrations.

21. Method as claimed in claim 20, wherein the leaching operation is carried out with agitation, with a solids density of about 10% and with a concentrate particle size of at least about 50% minus 325 mesh.

* * * * *